US009670290B2

(12) United States Patent
Landschütze et al.

(10) Patent No.: US 9,670,290 B2
(45) Date of Patent: Jun. 6, 2017

(54) ALTERNAN POLYSACCHARIDE THAT IS FUNCTIONALIZED WITH NITROGEN GROUPS THAT CAN BE PROTONATED, OR WITH PERMANENTLY POSITIVELY CHARGED NITROGEN GROUPS

(71) Applicant: CRODA INTERNATIONAL PLC, Yorkshire (GB)

(72) Inventors: Volker Landschütze, Berlin (DE); Sylvia Radosta, Nuthetal (DE); Waltraud Vorwerg, Potsdam (DE)

(73) Assignee: Croda International PLC, East Yorkshire (GB)

( * ) Notice: Subject to any disclaimer, the term of this patent is extended or adjusted under 35 U.S.C. 154(b) by 32 days.

(21) Appl. No.: 14/423,334

(22) PCT Filed: Aug. 23, 2013

(86) PCT No.: PCT/EP2013/067547
§ 371 (c)(1),
(2) Date: Feb. 23, 2015

(87) PCT Pub. No.: WO2014/029871
PCT Pub. Date: Feb. 27, 2014

(65) Prior Publication Data
US 2015/0203598 A1 Jul. 23, 2015

Related U.S. Application Data

(60) Provisional application No. 61/692,770, filed on Aug. 24, 2012.

(30) Foreign Application Priority Data

Aug. 24, 2012 (EP) ..................... 12181751

(51) Int. Cl.
*C08B 37/00* (2006.01)
*C09K 8/035* (2006.01)
*C08J 3/20* (2006.01)
*D21H 17/24* (2006.01)

(52) U.S. Cl.
CPC .......... *C08B 37/0009* (2013.01); *C08J 3/203* (2013.01); *C09K 8/035* (2013.01); *D21H 17/24* (2013.01)

(58) Field of Classification Search
CPC ........ C08B 37/0009; C09K 8/035; C08J 3/20; D21H 17/24
See application file for complete search history.

(56) References Cited

U.S. PATENT DOCUMENTS 4,411,891 A * 10/1983 Mizutani .................. A61K 8/73
424/47
5,426,174 A * 6/1995 Pourreau ................ C07C 43/11
528/413

5,702,942 A    12/1997 Leathers
5,786,196 A    7/1998 Cote
2003/0229923 A1 12/2003 Kossmann
2004/0214736 A1* 10/2004 Modi ...................... A61K 8/73
510/238

(Continued)

FOREIGN PATENT DOCUMENTS

CN    102517991    6/2012
WO    0047628     8/2000
WO    0047727     8/2000
(Continued)

OTHER PUBLICATIONS

Cote, G.L., "Alternan", Biopolymers Online, published online Jan. 15, 2005, p. 1-34.*
Nichifor et al., Carb. Polym., 2010, 82, p. 965-975.*
Cote, G.L., "Low-viscosity Alpha-D-glucan fractions derived from sucrose which are resistant to enzymatic digestion," 1992, pp. 249-252, vol. 19, Carbohydrate Polymers.
Cote, G.L. et al., "Isolation and partial characterization of an extracellular glucansucrase from Leuconostoc mesenteroides NRRL B-1355 that synthesizes an alternating (1→6), (1→3)-Alpha-D-glucan," 1982, pp. 57-74, vol. 101, Carbohydrate Research.
Jeanes, A. et al., "Characterization and classification of dextrans from ninety-six strains of bacteria," Oct. 20, 1954, pp. 5041-5052, vol. 76, Journal of the American Chemical Society.
Joucla, G. et al., "Construction of a fully active truncated alternansucrase partially deleted of its carboxy-terminal domain," 2006, pp. 763-768, vol. 580, FEBS Letters.
(Continued)

Primary Examiner — Jonathan S Lau
(74) Attorney, Agent, or Firm — RatnerPrestia

(57) ABSTRACT

Functionalized alternan polysaccharide, comprising nitrogen groups or permanently positively charged nitrogen groups that can be protonated as functional groups and can be described by the following formula, for instance: (I) wherein $R_1$ is a hydrocarbon group with 1 to about 100 carbon atoms, that may comprise one or more heteroatoms, $R_2$ and $R_3$ are each a hydrogen or a hydrocarbon group with 1 to about 20 carbon atoms that can comprise one or more heteroatoms, wherein $R_2$ and $R_3$ can be the same or different, or $R_2$ and $R_3$ form a 4-8 membered heterocyclic ring together with the nitrogen to which they are bound; Wherein said ring can be condensed with one or more additional isocyclic or heterocyclic rings, wherein the nitrogen can be bound to one of the $R_2$ or $R_3$ groups by way of a double bond and then bears a positive charge, wherein the nitrogen in Formula (I) is optionally protonated, and wherein the residues $R_1$, $R_2$ and $R_3$ can be selected independently from each other in multiple $-R_1NR_2R_3$ groups.

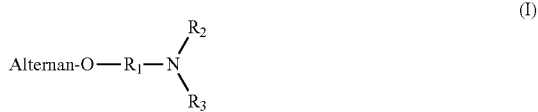

(I)

14 Claims, 4 Drawing Sheets

(56) References Cited

U.S. PATENT DOCUMENTS

2006/0127328 A1    6/2006    Monsan

FOREIGN PATENT DOCUMENTS

| WO | 0139721 | 6/2001 |
| --- | --- | --- |
| WO | 2006088884 | 8/2006 |
| WO | 2008098975 | 8/2008 |
| WO | 2010043423 | 4/2010 |

OTHER PUBLICATIONS

Misaki, A. et al., "Structure of the dextran of *Leuconostoc mesenteroides* B-1355," 1980, pp. 273-285, vol. 84, Carbohydrate Research.

Raemaekers, M.H.M. et al., "Production of Alternansucrase by Leuconostoc mesenteroides NRRL B-1355 in batch fermentation with controlled pH and dissolved oxygen," 1997, pp. 470-478, vol. 69, Journal of Chemical Technology and Biotechnology.

Ahmad, M.A., et al., "Optimization of preparation conditions for mangosteen peel-based activated carbons for the removal of Remazol Brilliant Blue R using response surface methodology," Dec. 15, 2010, pp. 883-890, vol. 165, No. 3, Chemical Engineering Journal, Elsevier.

Bayer, E.A., et al., "Biocytin-hydrazide-A selective label for sialic acids, galactose, and other sugars in glycoconjugates using avidin-biotin technology," 1988, pp. 271-281, vol. 170, No. 2, Analytical Biochemistry.

Bragd, P.L., et al. "Bromide-free TEMPO-mediated oxidation of primary alcohol groups in starch and methyl alpha-d-glucopyranoside," Sep. 22, 2000, pp. 355-363, vol. 328, No. 3, Carbohydrate Research, Elsevier.

Chang, P.S., et al., "Oxidation of primary alcohol groups of naturally occurring polysaccharides with 2,2,6,6-tetramethyl-1-piperidine oxoammonium ion," 1996, pp. 819-830, vol. 15, No. 7, Journal of Carbohydrate Chemistry.

Cote, G.L., "Alternan," Jan. 15, 2005, pp. 1-56, Biopolymers Online.

Delabouglise, D., et al., "Biotin grafting on boron-doped diamond," 2003, pp. 2698-2699, No. 21, Chemical Communication, The Royal Society of Chemistry.

Ho, Y.T., et al., "Improving emulsifying activity of epsilon-polylysine by conjugation with dextran through the Maillard reaction," 2000, pp. 449-455, vol. 68, Food Chemistry, Elsevier.

Kato, A., et al., "Functional protein-polysaccharide conjugate prepared by controlled dry-heating of ovalbumin-dextran mixtures," 1990, pp. 107-112, vol. 54, No. 1, Agricultural and Biological Chemistry.

Scott, T.A., et al., "Characterization of dextrans by the optical rotation of their cuprammonium complexes," 1957, pp. 1178-1182, vol. 79, Journal of the American Chemical Society.

Shah, D.S.H., et al., "Conserved repeat motifs and glucan binding by glucansucrases of oral streptococci and leuconostoc mesenteroides," Dec. 2, 2004, pp. 8301-8308, vol. 186, No. 24, Journal of Bacteriology.

International Search Report for International Application No. PCT/EP2013/067547 mailed Nov. 21, 2013.

European Search Report for European Application No. 12181751.4-2115 dated Jan. 30, 2013.

\* cited by examiner

ALTERNAN POLYSACCHARIDE THAT IS FUNCTIONALIZED WITH NITROGEN GROUPS THAT CAN BE PROTONATED, OR WITH PERMANENTLY POSITIVELY CHARGED NITROGEN GROUPS

CROSS REFERENCE TO RELATED APPLICATIONS

This application is the U.S. National Phase application of PCT International Application No. PCT/EP2013/067547, filed Aug. 23, 2013, and claims priority of U.S. Provisional Patent Application No. 61/692,770, filed Aug. 24, 2012 and EP Application No. 12181751.4, filed Aug. 24, 2012, the disclosures of which are incorporated herein by reference in their entireties for all purposes.

FIELD OF THE INVENTION

Alternan polysaccharide that is functionalized with nitrogen groups that can be protonated, or with permanently positively charged nitrogen groups.

The present invention relates to an alternan polysaccharide that is functionalized with protonatable nitrogen groups or permanently positively charged nitrogen groups; a process for producing it; and applications for this.

BACKGROUND OF THE INVENTION

Alternan (CAS registration no.: 136510-13-9) is a saccharide made up of anhydroglucose units that are primarily linked by alternating α-1.3 and α-1.6-glycosidic bonds. Thus alternan belongs to the group of the a glucans. Alternan and the processes for producing alternan are known from prior art and are described, for instance, in Jeanes et al. (1954) J. Am. Chem. Soc., 76: 5041-5052, Misaki et al. (1980) Carbohydr. Res., 84: 273-285, Cote and Robyt (1982), Carbohydr. Res., 101: 57-74, Cote (1992), Carbohydrate Polymers 19, 249-252, WO 00/47727, U.S. Pat. No. 5,702,942, US20060127328, PCT/EP2008/051760.

The state of the art describes derivatized alternan. Alternan carboxylic acid esters and their use as emulsifiers are known from WO2010043423A1.

SUMMARY OF THE INVENTION

An object of the present invention is to provide an alternan with novel properties. Novel properties are to be achieved that will render the alternan suitable for specific applications.

One aspect of the present invention relates to a functionalized alternan comprising nitrogen groups that can be protonated or permanently positively charged nitrogen groups as functional groups, wherein said nitrogen groups are bound to the alternan polysaccharide via an ether bridge.

DETAILED DESCRIPTION OF THE INVENTION

Figure 1:
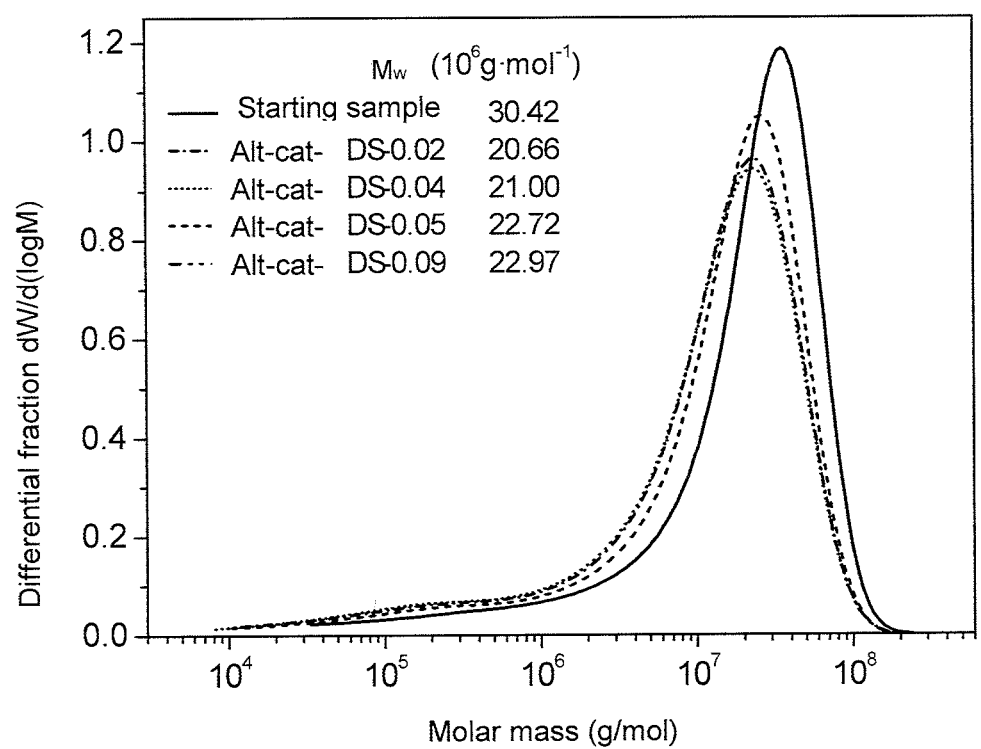
FIG. 1 shows the molar mass distribution for an alternan polysaccharide that is functionalized with quaternary ammonium groups and features various DS values, compared to the corresponding non-functionalized alternan precursor.

A functionalized alternan is shown that comprises nitrogen groups that can be protonated or permanently positively charged nitrogen groups as functional groups. In both cases, a cationic alternan can be obtained. In the case of a nitrogen group that can be protonated, a cationic alternan can be obtained through protonation. However, the invention includes both protonated and unprotonated forms.

Said nitrogen groups are bound to the alternan polysaccharide via ether groups, also called ether bridges. This specifically means that the nitrogen groups are each bound to the alternan backbone via an ether group that is directly attached to the backbone. The alternan backbone is composed of anhydroglucose units that are primarily linked by alternating α-1.3 and α-1.6-glycosidic bonds. The anhydroglucose units comprise hyroxy groups. "Directly attached to the backbone" means that an ether group originates from a hydroxy group of alternan, wherein said hydroxy group is converted to said ether group. During functionalization, hydroxy groups of an alternan that is not yet functionalized or chemically modified at these hydroxy groups (for example an alternan precursor) are converted to ether groups —O— and nitrogen groups are attached, for instance as described in below Formulas (I) through (IV), which describe specific embodiments. One or more nitrogen groups can be bound via one of said ether groups to the alternan polysaccharide. The functionalized alternan of the invention is an alternan-ether that comprises nitrogen groups that can be protonated or permanently positively charged nitrogen groups as functional groups.

The term "nitrogen group" is shorthand for a functional group that comprises at least one nitrogen atom.

The specified nitrogen groups are preferably selected from primary amine groups, secondary amine groups, tertiary amine groups, quaternary amine groups. A further nitrogen group is an imino carbamate group.

Nitrogen groups that can be protonated and permanently positively charged nitrogen groups are also described jointly using the term "nitrogen groups" in this application.

The term "nitrogen group that can be protonated" means that the group can be protonated at the nitrogen itself.

The present invention thus refers to a functionalized alternan polysaccharide that carries functional nitrogen groups which are either cationic groups under certain pH conditions after protonation, or which are permanent cationic groups.

For the purpose of this invention, the terms "quaternary ammonium group" and "quaternary amine group" describe the same functional group. A quaternary ammonium group describes an ammonium group with a quaternary nitrogen atom that features organic residues and a permanent positive charge.

In this invention, the term "nitrogen-group-functionalized alternan" describes an alternan to which nitrogen groups that can be protonated or permanently positively charged nitrogen groups have been bound by way of a chemical process.

In place of the term "nitrogen-group-functionalized alternan," the term "functionalized alternan" is also used as shorthand for the same concept. Another expression for "functionalized alternan" is the term "derivatized alternan."

Surprisingly, it was found that the functionalized alternan, or specific embodiments thereof, may show one or more of the following beneficial properties:
- very good water solubility
- increased transparency compared to unmodified alternan
- ability to produce concentrated aqueous solutions with viscosity that is several orders of magnitude higher than unmodified alternan
- ability to produce highly transparent hydrogels
- ability to produce simplex structures, which refer to complexes with anionic polymers
- high stability of the functionalization, even at low pH
- possibility degrade the molecular weight and thereby retaining the functional groups at oligomeric or monomeric units, The term "alternan" describes a substance that has already been defined above. In this invention, the term "alternan" refers to alternan polysaccharides. The shorter term "alternan" will thus also be used in place of "alternan polysaccharide" below, to refer to the polysaccharide for the purpose of the following description of the invention. The term "polysaccharide" refers to a polysaccharide with an average molar mass (weight average molecular weight) Mw of at least 3000 g/mol, preferably at least 5000 g/mol.

Alternan is preferably produced by a bacterial enzyme, particularly by an alternansucrase, wherein this term encompasses for purpose of the present invention alternansucrase from natural source or a modified alternansucrase. The term "modified alternansucrase" encompasses for example chemically or genetically modified alternansucrase. Possible modifications of alternansucrase are mutations, insertions, deletions, and/or truncations of amino acids. Natural and modified alternansucrase enzymes are—inter alia described in international patent applications WO 200047727 and WO2008098975.

One embodiment shows a functionalized alternan whose molecules primarily or exclusively have a degree of polymerization (DP) of at least 10, preferably at least 100, or at least 1000, or at least 10000, or at least 100000, but even more preferably at least 150000. The term "primarily" in a preferred definition means that the proportion of alternan molecules with the specified minimum DP has a concentration of more than 95% by weight, with reference to the total weight of all alternan molecules, or more preferably more than 97% by weight, or even more preferably more than 99% by weight.

In a special embodiment that can be combined with the previous and further embodiments, the functionalized alternan has an average molar mass Mw in the range from 3,000 g/mol to 60,000,000 g/mol, or more preferably from 5,000 g/mol to 60,000,000 g/mol, 10,000 g/mol to 60,000,000 g/mol, or 20,000 g/mol to 60,000.000 g/mol, or most preferably from 50,000 g/mol to 60,000,000 g/mol, 100,000 g/mol to 60,000,000 g/mol, or 500,000 g/mol to 60,000,000 g/mol. Other ranges are from 1,000,000 g/mol to 60,000,000 g/mol, 5,000,000 g/mol to 60,000,000 g/mol and 10,000,000 g/mol to 60,000,000 g/mol.

In yet another preferred embodiment, the functionalized alternan has an average molar mass Mw in the range from 12,000,000 to 30,000,000 g/mol, more preferably from 14,000,000 to 28,000,000 g/mol, even more preferably from 16,000,000 to 26,000,000 g/mol, most preferably from 19,000,000 to 23,000,000 g/mol. Non-functionalized alternan precursors with this Mw can be produced using a truncated alternan sucrase. The truncated alternan sucrases, the production process for this type of specialized alternan, and the alternan itself are described in the international application PCT/EP2008/051760, to which explicit reference is made here.

Methods for determining the average molar mass (Mw) are known to persons skilled in the art and include, for example, measurement methods using GPC (gel permeation chromatography) coupled with corresponding detection processes such as a differential refractometer and MALLS (Multi Angle Laser Light Scattering). A preferred method for determining the molar mass distribution (MMD) and the average molar mass (Mw) in conjunction with the present invention using GPC-MALLS is described in the "General methods" chapter.

The terms mentioned below for special embodiments have the following meanings:

In the formulas above and following, the term "alternan" refers to an alternan polysaccharide molecule. The oxygen bound to "alternan" is an oxygen from a hydroxy group from the non-functionalized alternan. Anhydroglucose units in the alternan can be functionalized at the free OH groups in the C-2, C-3, C-4 and/or C-6 position. The alternating bond types for the alternan mean that all of the OH groups in the C-2 and C-4 position of the anhydroglucose units, and about 50% of the OH groups in the C-3 and C-6 position, are available for functionalization. The invention's functionalized alternans thus contain primarily functionalizations at the C-2, C-3, C-4 and/or C-6 position of the anhydroglucose units of the polymer.

In the present invention, the term "alkyl group" refers to a monovalent, linear or branched, saturated hydrocarbon group. An alkyl group can be substituted with one or more functional groups selected from oxo, hydroxy, alkoxy, carboxy, aldehyde, amino, monoalkylamino, dialkylamino, nitro, fluoro, chloro, bromo and/or iodo. Preferred alkyl groups particularly include methyl ($-CH_3$), ethyl ($-CH_2CH_3$), propyl ($-CH_2CH_2CH_3$), isopropyl ($-CH(CH_3)_2$), butyl ($-CH_2CH_2CH_2CH_3$), isobutyl ($-CH_2CH(CH_3)CH_3$) and tert-butyl.

In the present invention, the term "alkylene group" refers to a divalent, linear or branched, saturated hydrocarbon group. An alkylene group can feature one or more substituents as described above for an alkyl group. Especially preferred alkylene groups are methylene ($-CH_2-$), ethylene ($-CH_2CH_2-$), propylene ($-CH_2CH_2CH_2-$), isopropylene ($-CH_2CH(CH_3)-$), butylene ($-CH_2CH_2CH_2CH_2-$) and isobutylene ($-CH_2CH(CH_3)CH_2-$), wherein methylene is most preferred.

In the present invention, the term "alkenyl group" refers to a monovalent, linear or branched hydrocarbon group that features one or more C—C double bonds. An alkenyl group can feature one or more substituents as described above for the alkyl group. A preferred alkenyl group is ethenyl ($CH_2=CH-$), also known as "vinyl."

In the present invention, the term "alkenylene group" refers to a divalent, linear or branched hydrocarbon group that features one or more C—C double bonds. An alkenylene group can feature one or more substituents as described above for the alkyl group.

In the present invention, the term "alkynyl group" refers to a monovalent, linear or branched hydrocarbon group that features one or more C—C triple bonds. An alkynyl group can feature one or more substituents as described above for the alkyl group. One example is the ethinyl group ($H-C\equiv C-$).

In the present invention, the term "alkynylene group" refers to a divalent, linear or branched hydrocarbon group that features one or more C—C triple bonds. An alkynylene group can feature one or more substituents as described above for the alkylene group.

In the present invention, the term "cycloalkyl group" refers to a monovalent saturated or partially unsaturated, non-aromatic carbocyclic group that is preferably made up of mono, bi or tricyclic carbon rings, wherein the cycles can be condensed or linked otherwise. A cycloalkyl group can feature one or more substituents as described above for an alkyl group. Furthermore, a cycloalkyl group can also feature alkyl, alkenyl or alkynyl groups as substituents, as defined above.

In the present invention, the term "cycloalkylene group" refers to a divalent saturated or partially unsaturated, non-aromatic carbocyclic group that is preferably made up of mono, bi or tricyclic carbon rings, wherein the cycles can be condensed or linked otherwise. A cycloalkylene group can feature one or more substituents as described above for the alkyl group. Furthermore, a cycloalkylene group can also feature alkyl, alkenyl or alkynyl groups as substituents, as defined above.

In the present invention, the term "hetero-cycloalkyl group" refers to a monovalent saturated or partially unsaturated, non-aromatic carbocyclic group that is preferably made up of mono, bi or tricyclic carbon rings, wherein the cycles can be condensed or linked otherwise, and wherein one or more carbon atoms in the ring system are also replaced by a heteroatom, particularly nitrogen, oxygen or sulfur. A hetero-cycloalkyl group can feature one or more substituents as described above for an alkyl group. Furthermore, a hetero-cycloalkyl group can also feature alkyl, alkenyl or alkynyl groups as substituents, as defined above.

In the present invention, the term "hetero-cycloalkylene group" refers to a divalent saturated or partially unsaturated, non-aromatic carbocyclic group that is preferably made up of mono, bi or tricyclic carbon rings, wherein the cycles can be condensed or linked otherwise, and wherein one or more carbon atoms in the ring system are also replaced by a heteroatom, particularly nitrogen, oxygen or sulfur. A hetero-cycloalkylene group can feature one or more substituents as described above for an alkyl group. Furthermore, a hetero-cycloalkylene group can also feature alkyl, alkenyl or alkynyl groups as substituents, as defined above.

In the present invention, the term "aryl group" refers to a monovalent cyclic aromatic group that is preferably mono, bi or tricyclic, wherein the cycles can be condensed or linked otherwise through C—C bonds. Some examples are phenyl, naphtyhl, biphenyl, anthracyl and phenantryl. An aryl group can feature one or more substituents as described above for an alkyl group. Furthermore, an aryl group can also feature alkyl, alkenyl or alkynyl groups as substituents, as defined above.

In the present invention, the term "arylene group" refers to a divalent cyclic aromatic group that is preferably mono, bi or tricyclic, wherein the cycles can be condensed or linked otherwise through C—C bonds. Some examples are phenylene, naphthylene, biphenylene, anthracylene and phenantrylene. An arylene group can feature one or more substituents as described above for an alkyl group. Furthermore, an arylene group can also feature alkyl, alkenyl or alkynyl groups as substituents, as defined above.

In the present invention, the term "hetero-aryl group" refers to a monovalent cyclic aromatic group that is preferably mono, bi or tricyclic, wherein the cycles can be condensed or linked otherwise through C—C bonds, and where one or more carbon atoms in the ring system are also replaced by a heteroatom, particularly nitrogen, oxygen or sulfur. A hetero-arylene group can feature one or more substituents as described above for an alkyl group. Furthermore, a hetero-aryl group can also feature alkyl, alkenyl or alkynyl groups as substituents, as defined above.

In the present invention, the term "hetero-arylene group" refers to a divalent cyclic aromatic group that is preferably mono, bi or tricyclic, wherein the cycles can be condensed or linked otherwise through C—C bonds, and wherein one or more carbon atoms in the ring system are also replaced by a heteroatom, particularly nitrogen, oxygen or sulfur. A hetero-arylene group can feature one or more substituents as described above for an alkyl group. Furthermore, a hetero-aryl group can also feature alkyl, alkenyl or alkynyl groups as substituents, as defined above.

In one embodiment, the invention relates to a functionalized alternan polysaccharide described by the following Formula (I):

wherein $R_1$ is a hydrocarbon group with 1 to about 100 carbon atoms that can comprise one or more heteroatoms.

$R_2$ and $R_3$ are each a hydrogen or hydrocarbon group with 1 to about 20 carbon atoms that can comprise one or more heteroatoms, wherein $R_2$ and $R_3$ can be the same or different, or $R_2$ and $R_3$ form a 4-8 membered heterocyclic ring together with the nitrogen to which they are bound, wherein said ring can be condensed with one or more additional isocyclic or heterocyclic rings, wherein the nitrogen can be bound to one of $R_2$ or $R_3$ by way of a double bond and then bears a positive charge. Preferred heteroatoms, without limitation, are O, N, S, P, F, Cl, Br, I. A heteroatom can be integrated into the carbon chain such that the carbon chain is interrupted by the heteroatom. For instance, the $R_2$ and/or $R_3$ groups may contain ether units such as —$CH_2$—O—$CH_2$—, thioether units such as —$CH_2$—S—$CH_2$—, or —$CH_2$—NH—$CH_2$— units. In another variant, the heteroatom(s) is/are linked to the carbon backbone in the form of a substituent, for instance in the form of an oxo, hydroxy, mercapto, halogen, amino or nitro group, wherein a hydroxy group is most preferred.

$R_1$, $R_2$ and $R_3$ can be selected independently from one another in multiple —$R_1NR_2R_3$ groups. In a more specific embodiment one or more —$R_1NR_2R_3$ groups can be present.

The oxygen between the "alternan" and the —$R_1NR_2R_3$ group is an oxygen originating from a hydroxy group from an alternan, for example an alternan precursor, that is not yet functionalized or chemically modified at this hydroxy group. The —$R_1NR_2R_3$ group is thus bound to the alternan backbone, in other words the backbone of the alternan polysaccharide, via such an oxygen. Said oxygen is the oxygen of an ether group in formula (I), in other words it forms an ether bridge.

In this embodiment, the —$R_1NR_2R_3$ group is a primary, secondary or tertiary amine group. It can be protonated or alkylated, which produces a cationically functionalized alternan that is also included in the invention.

$R_1$ describes a hydrocarbon group that can also feature one or more heteroatoms in addition to carbon and hydrogen. The preferred heteroatoms, without limitation, are O, N, S, P, F, Cl, Br, I. A heteroatom can be integrated into a carbon chain or a carbon backbone such that the carbon chain/backbone is interrupted by the heteroatom. For instance, the $R_1$ group can contain ether units such as —$CH_2$—O—$CH_2$—, thioether units such as —$CH_2$—S—$CH_2$—, or —$CH_2$—NH—$CH_2$— units. In another variant, the heteroatom(s) is/are linked to the main carbon chain or the carbon backbone in the form of a substituent, for instance in the form of an oxo, imino, hydroxy, mercapto, halogen, carboxyl, carboxamide, amino or nitro group, wherein hydroxy is most preferred. The invention also includes embodiments in which the $R_1$ group features one or more additional —$NR_2R_3$ groups.

In a special embodiment, the $R_1$ hydrocarbon group is selected from an alkylene group, an alkenylene group, an alkynylene group, a cycloalkylene group, a hetero-cycloalkylene group, an arylene group or a hetero-arylene group. It also includes mixtures in any combination thereof, for instance a hydrocarbon group consisting of one or more alkylene groups and one or more arylene groups a hydrocarbon group consisting of one or more alkylene groups and one or more cycloalkylene groups.

$R_1$ is particularly preferably an alkylene group, especially an ethylene group, propylene group or isopropylene group, a hydroxy alkylene group, particularly a 2-hydroxy propylene group (—$CH_2$—CH(OH)—$CH_2$—), an alkenylen group, particularly a 2-butylene group (—$CH_2$—CH=CH—$CH_2$—).

In another preferred embodiment, $R_1$ is a C=NH imino group and a compound is obtained comprising structures of Formula (VI):

$R_2$ and $R_3$, as mentioned, describe a hydrocarbon group that can comprise one or more heteroatoms in addition to carbon and hydrogen. Preferred heteroatoms, without limitation, are O, N, S, P, F, Cl, Br, I. A heteroatom can be integrated into the carbon chain such that the carbon chain is interrupted by the heteroatom. For instance, the $R_2$ and/or $R_3$ groups may contain ether units such as —$CH_2$—O—$CH_2$—, thioether units such as —$CH_2$—S—$CH_2$—, or —$CH_2$—NH—$CH_2$— units. In another variant, the heteroatom(s) is/are linked to the carbon backbone in the form of a substituent, for instance in the form of an oxo, hydroxy, mercapto, halogen, amino or nitro group, wherein a hydroxy group is most preferred. The invention also includes embodiments in which the $R_2$ and/or $R_3$ group features one or more additional —$NR_2R_3$ groups.

In a special embodiment, the hydrocarbon group for $R_2$ and/or $R_3$ is selected from an alkyl group, an alkenyl group, an alkynyl group, a cycloalkyl group, a hetero-cycloalkyl group, an aryl group or a hetero-aryl group. It also includes mixtures in any combination thereof, for instance a hydrocarbon group consisting of one or more alkyl groups and/or alkylene groups and one or more aryl groups and/or arylene groups a hydrocarbon group consisting of one or more alkyl groups and/or alkylene groups and one or more cycloalkyl groups and/or cycloalkylene groups.

As mentioned above, $R_2$ and $R_3$ can form a 4-8 membered heterocyclic ring together with the nitrogen to which they are bound. Some examples are pyrrolidine, pyrrol, piperidine, pyridine, hexamethylenimine, azatropilidene, pyrazole, imidazole, imidazoline and pyrimidine. The heterocyclic ring can contain one or more additional nitrogens or heteroatoms that differ from nitrogen. Pyridine is preferred, wherein the nitrogen is bound to one of the $R_2$ or $R_3$ groups through a double bond. As a result, Formula (I) contains a pyridinium structure in which the nitrogen is permanently positively charged. The heterocyclic ring can be condensed with one or more additional rings. Some examples of these condensed structures are quinoline, indole, benzimidazole, isoquinoline and purine.

Especially preferred $R_2$ and $R_3$ are methyl (—$CH_3$), ethyl (—$CH_2CH_3$), propyl (—$CH_2CH_2CH_3$), isopropyl, lauryl, stearyl or cocoalkyl, wherein $R_2$ and $R_3$ can be the same or different.

One variant specifies a functionalized alternan polysaccharide with structures of following Formula (II):

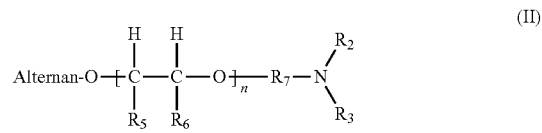

wherein $R_2$ and $R_3$ are defined as above, and are each a hydrogen or hydrocarbon group with 1 to about 20 carbon atoms that can comprise one or more heteroatoms, wherein $R_2$ and $R_3$ can be the same or different, or $R_2$ and $R_3$ can form a 4-8 membered heterocyclic ring together with the nitrogen to which they are bound, wherein said ring can be condensed with one or more additional isocyclic or heterocyclic rings, wherein the nitrogen can be bound to one of the $R_2$ or $R_3$ groups by way of a double bond and then bears a positive charge, n is an integer from 1 to about 30, preferably 1 to about 20, more preferably 1 to about 10, $R_5$ and $R_6$ are selected from H or a hydrocarbon group with 1 to about 6 carbon atoms, wherein $R_5$ and $R_6$ can have the same or different meaning in the —($CHR_5$—$CHR_6O$)— units and each $R_5$ and $R_6$ in a —($CHR_5$—$CHR_6O$)— unit can be selected independently from each $R_5$ and $R_6$ in another —($CHR_5$—$CHR_6$—O)— unit, $R_7$ is a hydrocarbon group with 1 to about 10 carbon atoms, wherein $R_7$ may comprise one or more heteroatoms, and wherein the number n and the residues $R_2$, $R_3$, $R_5$, $R_6$ and $R_7$ can be selected independently from each other in multiple —[$CHR_5$—$CHR_6$—O]$_n$$R_7NR_2R_3$ groups, and wherein the nitrogen in Formula (II) can be optionally protonated.

In a specific embodiment one or more of the —[$CHR_5$—$CHR_6$—O]$_n$$R_7NR_2R_3$ groups can be present.

The oxygen between the "Alternan" and the —[$CHR_5$—$CHR_6$—O]$_n$$R_7NR_2R_3$ group is an oxygen originating from a hydroxy group of an alternan, for example an alternan precursor, that is not yet functionalized or chemically modified at this hydroxy group. The —[$CHR_5$—$CHR_6$—O]$_n$$R_7NR_2R_3$ group is thus bound to the alternan backbone via this type of oxygen, in other words with the backbone of the alternan polysaccharide. Said oxygen is the oxygen of an ether group in formula (II), in other words it forms an ether bridge.

Specifically, $R_5$ can be selected from hydrogen, an alkyl group or a phenyl group. Preferably, $R_5$ is $C_1$ to $C_4$ alkyl or hydrogen, even more preferably a methyl group, an ethyl group or hydrogen, and most preferably a methyl group or hydrogen. These $R_5$ groups can be combined with any value n.

Specifically, $R_6$ can be selected from hydrogen, an alkyl group or a phenyl group. Preferably, $R_6$ is $C_1$ to $C_4$ alkyl or hydrogen, even more preferably a methyl group, an ethyl group or hydrogen, and most preferably a methyl group or hydrogen. These $R_6$ groups can be combined with any $R_5$ and any value n.

In an embodiment that can be combined with any value n, $R_5$ is hydrogen and $R_6$ is hydrogen, methyl or ethyl, most preferably hydrogen or methyl.

In an embodiment that can be combined with any value n, $R_6$ is hydrogen and $R_5$ is methyl or ethyl, most preferably methyl.

With the exception of the maximum number of carbon atoms, $R_7$ is generally and specifically defined in the same way as $R_1$. Especially preferred $R_7$ is an alkylene group, particularly an ethylene group, propylene group or isopropylene group, a hydroxy alkylene group, particularly a 2-hydroxy propylene group ($-CH_2-CH(OH)-CH_2-$), an alkenylene group, particularly a 2-butenylene group ($-CH_2-CH=CH-CH_2-$). In another preferred embodiment, $R_7$ is a $C=NH-$ imino group.

In another embodiment a functionalized alternan polysaccharide is provided that comprises structures of following Formula (III):

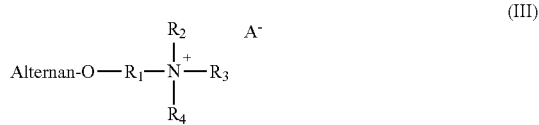

(III)

wherein
$R_1$ is a hydrocarbon group with 1 to about 100 carbon atoms, which can comprise one or more heteroatoms,
$R_2$, $R_3$ and $R_4$ are each a hydrocarbon group with 1 to about 20 carbon atoms, which can comprise one or more heteroatoms, wherein $R_2$, $R_3$ and $R_4$ can be the same or different, wherein the residues $R_1$, $R_2$, $R_3$ and $R_4$ can be selected independently from one another in multiple of $-R_1N^+R_2R_3R_4$ groups,
and $A^-$ is an anion,
preferably a halogenide anion, most preferably chloride, bromide or iodide.

In this embodiment, the $-R_1N^+R_2R_3R_4$ group is a quaternary ammonium group. In one embodiment one or more of the $-R_1N^+R_2R_3R_4$ groups may be present.

The oxygen between the "alternan" and the $-R_1N^+R_2R_3R_4$ group is an oxygen originating from a hydroxy group of an alternan, for example an alternan precursor, that is not yet functionalized or chemically modified at this hydroxy group. The $-R_1N^+R_2R_3R_4$ group is thus bound to the alternan backbone, in other words the backbone of the alternan polysaccharide, via such an oxygen. Said oxygen is the oxygen of an ether group in formula (III), in other words it forms an ether bridge.

The specifics of the $R_1$, $R_2$ and $R_3$ groups have already been explained above, and this explanation also applies to Formula (III), with the exception that $R_2$ and $R_3$ in Formula (III) are not hydrogens.

$R_4$ describes a hydrocarbon group that can comprise one or more heteroatoms in addition to carbon and hydrogen. Preferred heteroatoms, without limitation, are O, N, S, P, F, Cl, Br, I. A heteroatom can be integrated into a carbon chain such that the carbon chain is interrupted by the heteroatom. For instance, the $R_4$ group can contain ether units such as $-CH_2-O-CH_2-$ or thioether units such as $-CH_2-S-CH_2-$, or $-CH_2-NH-CH_2-$ units. In another variant, the heteroatom(s) is/are attached to the carbon backbone as a substituent, for instance in the form of an oxo, hydroxy, mercapto, halogen, amino, or nitro group, wherein a hydroxy group is most preferable.

The invention also includes embodiments in which the $R_2$, $R_3$ and/or $R_4$ groups feature one or more additional quaternary ammonium groups in addition to the quaternary ammonium group described in Formula (III).

In a special embodiment, the $R_4$ hydrocarbon group is selected from an alkyl group, an alkenyl group, an alkynyl group, a cycloalkyl group, a hetero-cycloalkyl group, an aryl group or a hetero-aryl group. It also includes mixtures in any combination thereof, for instance
 a hydrocarbon group consisting of one or more alkyl groups and/or alkylene groups and one or more aryl groups and/or arylene groups
 a hydrocarbon group consisting of one or more alkyl groups and/or alkylene groups and one or more cycloalkyl groups and/or cycloalkylene groups.

Especially preferred are $R_2$, $R_3$ and $R_4$ methyl ($-CH_3$), ethyl ($-CH_2CH_3$), propyl ($-CH_2CH_2CH_3$), lauryl, stearyl or cocoalkyl, wherein $R_2$, $R_3$ and $R_4$ can be the same or different. In one variant, one of the $R_2$, $R_3$ or $R_4$ groups is lauryl, stearyl or cocoalkyl, and the two remaining groups are selected from methyl, ethyl or propyl, preferably methyl.

In another special variant a functionalized alternan polysaccharide is provided that comprises structures of Formula (IV):

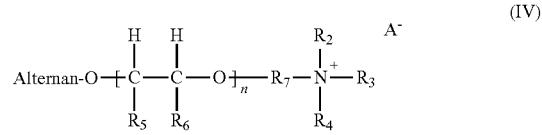

(IV)

wherein
n is an integer from 1 to about 30, preferably 1 to about 20, more preferably 1 to about 10, $R_2$, $R_3$ and $R_4$ are defined as above in Formula (III),
$R_5$ and $R_6$ are selected from H or a hydrocarbon group with 1 to about 6 carbon atoms, wherein $R_5$ and $R_6$ can be the same or different in the $-(CHR_5-CHR_6O)-$ units, and each $R_5$ and $R_6$ in a $-(CHR_5-CHR_6O)-$ unit can be selected independently from each $R_5$ and $R_6$ in another $-(CHR_5-CHR_6-O)-$ unit,
$R_7$ is a hydrocarbon group with 1 to about 10 carbon atoms, that can comprise one or more heteroatoms,
and wherein the number n and the residues $R_2$, $R_3$, $R_4$, $R_5$, $R_6$ and $R_7$ can be selected independently from one another in multiple of the $-[CHR_5-CHR_6-O]_nR_7N^+R_2R_3R_4$ groups,
and $A^-$ is an anion.

In a specific embodiment one or more of the —[CHR$_5$—CHR$_6$—O]$_n$R$_7$N$^+$R$_2$R$_3$R$_4$ groups can be present.

The oxygen between the "alternan" and the —[CHR$_5$—CHR$_6$—O]$_n$R$_7$N$^+$R$_2$R$_3$R$_4$ group is an oxygen originating from a hydroxy group from an alternan, for example an alternan precursor, that is not yet functionalized or chemically modified at this hydroxy group.

The —[CHR$_5$—CHR$_6$—O]$_n$R$_7$N$^+$R$_2$R$_3$R$_4$ group is thus bound to the alternan backbone, in other words the backbone of the alternan polysaccharide, via such an oxygen. Said oxygen is the oxygen of an ether group in formula (IV), in other words it forms an ether bridge.

With the exception of the maximum number of carbon atoms, R$_7$ is generally and specifically defined in the same way as R$_1$. Especially preferred is R$_7$ as an alkylene group, particularly an ethylene group, propylene group or isopropylene group, a hydroxy alkylene group, particularly a 2-hydroxy propylene group (—CH$_2$—CH(OH)—CH$_2$—), an alkenylene group, particularly a 2-butenylene group (—CH$_2$—CH=CH—CH$_2$—). In another preferred embodiment, R$_7$ is a C=NH— imino group.

In one embodiment, the invention also relates to a functionalized alternan polysaccharide that is functionalized as specified above and that also comprises one or more of the groups of Formula (V):

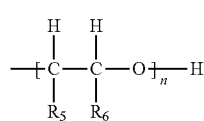

(V)

wherein the group of Formula (V) is bound to the alternan polysaccharide via an ether bridge, n is an integer from 1 to about 30, preferably 1 to about 20, more preferably 1 to about 10, R$_5$ and R$_6$ are defined as specified above for both general and specific embodiments.

The bond via an ether bridge means that the group of Formula (V) is bound to an oxygen of an alternan. The oxygen originates from a hydroxy group of an alternan, for example an alternan precursor, that is not yet functionalized or chemically modified at this hydroxy group. The group of Formula (V) is thus bound to the alternan backbone, in other words the backbone of the alternan polysaccharide, by way of such an oxygen. The bond between the group of Formula (V) to the "alternan" is thus analogous as in the structure of Formula (II) or (IV).

Another embodiment of the invention specifies a functionalized alternan polysaccharide in which the average number of hydroxyl groups in the alternan that are functionalized with a nitrogen group is 0.01 to 3 per anhydroglucose unit, preferably 0.01 to 2, even more preferably 0.01 to 1, or 0.01 to 0.5, most preferably 0.01 to 0.1.

In another embodiment, the average number of nitrogen-functionalized hydroxyl groups in the alternan is 0.02 to 3 for each anhydroglucose unit, preferably 0.02 to 2, more preferably 0.02 to 1 or 0.02 to 0.5, even more preferably 0.02 to 0.3 or 0.02 to 0.2, most preferably 0.02 to 0.1. Such values are achieved when the manufacturing process described below is performed at an increased temperature.

Another embodiment of the invention specifies a functionalized alternan polysaccharide in which the average number of nitrogen-functionalized hydroxyl groups in the alternan is >0.1 to 3 per anhydroglucose unit, preferably >0.1 to 2, even more preferably >0.1 to 1. Other achievable DS ranges are 0.15 to 3, more preferably 0.15 to 2 or 0.15 to 1. Other achievable DS ranges are 0.2 to 3, more preferably 0.2 to 2 or 0.2 to 1. The DS values specified in this paragraph can be beneficially achieved by performing the manufacturing process for the functionalized alternan polysaccharide in an alcoholic medium, as described later using a special process variant.

In another embodiment, the average number of functionalized hydroxyl groups in the alternan is >0.5 to 3 per anhydroglucose unit, preferably 0.55 to 3, even more preferably >0.6 to 3, most preferably 0.65 to 3.

The type of nitrogen-group functionalization in hydroxy groups of the not-yet functionalized alternan is described for example in Formulas (I) through (IV), wherein the oxygen adjacent to the designation "alternan" is an oxygen originating from a hydroxy group of an alternan that is not-yet functionalized at this hydroxy group. During functionalization, a hydroxy group is converted to an ether group —O— and a nitrogen group is attached, for instance as described in Formulas (I) through (IV). This is described as a "functionalized hydroxy group." Formulas (I) through (IV) provide examples, and other bonding options are possible.

The average number of functionalized hydroxyl groups in the alternan per anhydroglucose unit is also described as the "degree of substitution" (DS). Each anhydroglucose unit has a maximum of three free hydroxyl groups available, so the DS can be a maximum of 3 if all three hydroxyl groups have been substituted and there are no differences between the monomers along the chain.

All of the abovementioned DS ranges can be combined in any number of ways with all of the abovementioned molar mass ranges and DP ranges of the functionalized alternan.

In one embodiment, the functionalized alternan is cross-linked. The crosslinking can be reversible or irreversible, for instance a physical or chemical crosslinking, preferably a chemical crosslinking. A series of agents and processes are suitable for reversible or irreversible crosslinking of hydroxyl groups in the alternan. Crosslinking agents are explained below in the production process for a functionalized, crosslinked alternan.

In one embodiment, the functionalized alternan polysaccharide also comprises anionic groups as functional groups. In this embodiment, the invention relates to an amphoteric alternan polysaccharide that comprises both the described cationic or cationizable nitrogen groups as well as an anionic group. Preferred anionic groups are carboxyl groups.

Preferably, the functionalized alternan is water-soluble. In particular, the term "water-soluble" means water solubility up to 5% by weight or more, preferably up to 7% by weight or more. Surprisingly, it was found that with the achieved substitution degrees described above, the product forms aqueous solutions with constant viscosity or gels, depending on the DS value and concentration. This property is surprising because WO0047628 describes derivatized polysaccharides with these degrees of substitution as being insoluble. Hydrogels can be created at relatively high DS values, which limit the applicable concentration for a free-flowing solution.

In addition, the resulting functionalized alternan is preferably not microstructured. In particular, the functionalized alternan is not microfibrillar; in other words, it does not feature any microfibrils. The term "microfibrillar" refers to structures that are described in WO0047628 using cellulose and derivatized cellulose. In WO0047628, p. 11, l. 5-15, microfibrils are defined as substructures with a small diameter and high length-to-diameter ratio, and with dimensions comparable to natural cellulose microfibrils. As an example, it mentions microfibrils with a diameter of about 20 to about 100 nm, and a high length-to-diameter ratio such as more than 100, 500 or 1000. Natural cellulose microfibrils are described in WO0047628 as bundles that run parallel within a matrix of amorphous structures (WO0047628, p. 10, l. 25-p. 11, l. 4, to which explicit reference is made here).

Previously known spinning techniques for cellulose, as described in WO0047628, p. 11, also cannot be used to bring the functionalized alternan in the present invention into a microfibrillar or fibrous state. Experiments have shown that the dissolved functionalized alternan does not coagulate into filaments when it emerges from a spinning nozzle into a precipitation bath.

In another embodiment, the functionalized alternan does not feature any cyclic alternan molecules, only non-cyclic alternan molecules, in other words chains that are not self-contained.

In yet another embodiment, the functionalized alternan primarily features non-cyclic alternan molecules.

In another aspect, the invention relates to a process for functionalizing alternan with nitrogen groups that can be protonated or permanently positively charged nitrogen groups, wherein the alternan is reacted in a liquid reaction medium with a functionalizing agent that comprises such a nitrogen group, with the addition of an alkaline component that acts as a catalyst.

Preferably, the process is performed at a temperature of 40-90° C., preferably 40-80° C. That provides the additional benefit that relatively high degrees of substitution (DS) are achieved, for instance 0.02 to 3.

In this context, the term "alternan" refers to a not-yet functionalized alternan, in other words the alternan precursor. Preferably, the molar mass of the not-yet functionalized alternan is chosen such that a functionalized alternan with an average molar mass Mw is obtained as specified earlier in the description of the functionalized alternan.

In the context of the invention, an alkaline component as catalyst refers to a substance that contains hydroxide ions ($OH^-$) or forms hydroxide ions once it is added to the reaction mixture. Bases, carbonates and alkaline earth oxides are encompassed. The catalyst can be liquid, solid or gaseous. Preferably, a liquid alkaline component is used.

In one embodiment, the alkaline component is a aqueous solution or a suspension of an alkali or alkaline earth hydroxide, or a aqueous solution or suspension of an alkaline earth oxide. The hydroxide is preferably selected from lithium hydroxide, sodium hydroxide, potassium hydroxide, barium hydroxide and calcium hydroxide, wherein the alkaline component is preferably aqueous sodium hydroxide or aqueous potassium hydroxide or calcium oxide dissolved in water.

The process can be performed in the following steps:
a) dissolving and/or suspending the alternan,
b) adding the alkaline component, preferably while stirring, and preferably in the form of a aqueous base,
c) adding the functionalizing agent, preferably while stirring.

Next, the following steps can be performed:
ending the synthesis by cooling
separating the alternan.

In addition, the following reprocessing and cleaning steps can be performed:
suspending the alternan product, preferably in an alcohol/water mixture, for instance in MeOH/water (for example 8:2; v/v)
setting a neutral or nearly neutral pH value, for instance with glacial acetic acid
washing the product, for instance in an alcohol/water mixture and/or alcohol, particularly with MeOH/water (8:2; v/v) and then with methanol
drying, for instance vacuum-drying.

Whether Step a) produces a solution or a suspension depends on the concentration of the non-functionalized alternan and the solubility of the non-functionalized alternan, which depends inter alia on its molar mass. Preferably, a swollen suspension is produced.

The process is preferably performed under normal pressure, in other words ambient pressure.

The equipment for performing the process is not limited to specialized devices. In general, reactors can be used that are also used for producing carboxymethyl cellulose. Some examples are stirred tank reactors, plug-flow reactors and kneaders.

The following section describes synthesis paths for obtaining various functionalized alternans, selected as examples.

In order to obtain the compound of Formula (I), non-functionalized alternan can be reacted with a functionalizing agent that has the following Formula (VII):

(VII)

wherein $R_1$, $R_2$ and $R_3$ have the same meaning as described above and X is a halogen atom, particularly chlorine, bromine or iodine.

Particularly preferred functionalization agents of this type, without limitation, are dialkyl amino alkyl-halogenides such as 2-diethyl amino ethyl chloride, 2-diisopropyl amino ethyl chloride, 2-diethyl amino ethyl bromide, and 2-dimethyl amino isopropyl chloride.

In order to obtain compounds of Formula (I), non-functionalized alternan can be reacted in another variant with a functionalizing agent that has the following formula (VIII):

(VIII)

wherein $R_2$ and $R_3$ have the same meaning as described above and m is an integer from 1 to 10, preferably 1. A particularly preferable functionalizing agent for this type is 2,3-epoxypropyl diethyl amine.

In order to obtain the compounds of Formula (I), non-functionalized alternan can in further variants be reacted with ethylene imine (aziridine), cyanamide or dialkyl cyanamide.

In order to obtain the compounds of Formula (III), non-functionalized alternan can be reacted with a functionalizing agent that has a structure and definition analogous to the functionalizing agents in the above formulas (VII) or (VIII), wherein the nitrogen also features an additional residue $R_4$ that has the same meaning as described earlier, such that the nitrogen is positively charged and the functionalizing agent features a quaternary ammonium group. In this context, especially preferred functionalizing agents are glycidyltrimethyl ammonium chloride, also known as 2,3-epoxypropyl trimethyl ammonium chloride (EPTAC), 3-chloro-2-hydroxypropyl-trimethyl ammonium chloride (CHTAC), 3-chloro-2-hydroxypropyl-triethyl ammonium chloride, 3-chloro-2-hydroxypropyl-alkyl-dimethyl ammonium chloride, wherein alkyl stands for an alkyl group with 2 to 20 carbon atoms in this context, preferably dodecyl, cocoalkyl or stearyl.

Such functionalizing agents are available under the following commercial names, among others: "Quab 151", "Quab 188", "Quab 342", "Quab 360" and "Quab 426" from Quab Chemicals.

The compounds of Formula (III) can also be obtained by first producing a compound of Formula (I) and then reacting this compound with an alkylating agent, wherein the alkylating agent features an $R_4$ group, which in this case is an alkyl group, and the nitrogen is alkylated with an $—R_4$ group. Some examples of such alkylating agents are 2-chlorethanol, methyl iodide, ethyl iodide, methyl bromide, ethyl bromide, alkylene oxide and dimethyl sulfate.

The following section describes several embodiments of the process, where the non-functionalized alternan or the nitrogen-functionalized alternan is reacted with one or more epoxy compounds.

In a first process variant, non-functionalized alternan is first reacted with one or more epoxy compounds, which preferably have Formula (IX):

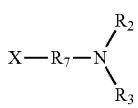
(IX)

wherein $R_5$ and $R_6$ are defined as specified above. The preferred compounds of Formula (IX) are ethylene oxide and propylene oxide. An alternan is obtained that comprises one or more of the groups in Formula (V):

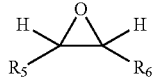
(V)

wherein n is an integer from 1 to 30, preferably 1 to about 20, more preferably 1 to about 10. Next, the product can be reacted with a compound of Formula (X):

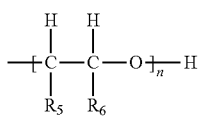
(X)

wherein $R_2$, $R_3$ and $R_7$ have the same meaning as given above and X is a halogen atom, particularly chlorine, bromine or iodine. Especially preferred functionalizing agents of this type, without limitation, are dialkylamino-alkyl-halogenides, such as 2-diethylaminoethylchloride, 2-diisopropylaminoethylchloride, 2-diethylaminoethylbromide, and 2-dimethylaminoisopropylchloride. The product is a compound having the structures of Formula (II),

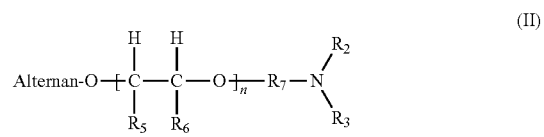
(II)

wherein the alternan can include one or more $—[CHR_5—CHR_6—O]_nR_7NR_2R_3$ groups.

The product, which features groups of Formula (V), can also be reacted with a functionalizing agent of above Formula (VIII), for instance. A hydroxy alkylene group between N and O is obtained, preferably a hydroxy propylene group.

The compound of Formula (X) or Formula (VIII) can react with terminal OH groups that are present in groups of Formula (V). This conversion does not need to be complete. In the event of an incomplete conversion, the result is a nitrogen-functionalized alternan that also comprises groups of Formula (V). The degree of conversion can be set through the reagent volume and reaction conditions. In addition, the compound of Formula (X) or Formula (VIII) can also react with free OH groups that are present directly on the alternan backbone.

Analogously, an alternan comprising one or more groups of Formula (V):

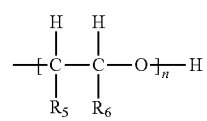
(V)

can be reacted with a functionalizing agent described above in producing compounds of Formula (III), for instance glycidyl-trimethyl ammoniumchloride, also known as 2,3-epoxypropyl-trimethyl ammoniumchloride (EPTAC), 3-chloro-2-hydroxypropyl-trimethyl ammonium chloride (CHTAC), 3-chloro-2-hydroxypropyl-triethyl ammonium chloride, 3-chloro-2-hydroxypropyl-alkyl-dimethyl ammonium chloride, wherein alkyl stands for an alkyl group with 2 to 20 carbon atoms in this context, preferably dodecyl, cocoalkyl or stearyl.

In this case, too, the functionalizing agent reacts with terminal OH groups that are present in groups of Formula (V). This conversion does not need to be complete. In the event of an incomplete conversion, the result is an alternan functionalized with quaternary ammonium groups that also comprises groups of Formula (V). The degree of conversion can be set through the reagent volume and reaction conditions. In addition, in this case the functionalizing agent can also react with free OH groups that are present directly at the alternan backbone.

In a second variant of the process, an alternan already functionalized with nitrogen groups, comprising structures of Formula (I),

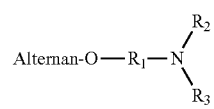
(I)

where $R_1$, $R_2$ and $R_3$ are defined as specified above, or comprising structures of Formula (III),

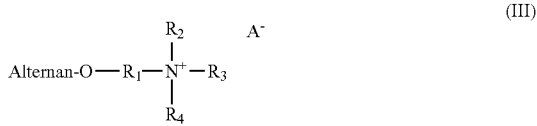

wherein $R_1$, $R_2$, $R_3$ and $R_4$ are defined as specified above, is reacted with an epoxy compound or multiple epoxy compounds that preferably have Formula (IX):

The result is a nitrogen-functionalized alternan that comprises structures of Formula (I) or (III) and also comprises groups of the above Formula (V).

Additional process variants are possible, using various sequences of reaction steps.

The molar ratios of the substances used in the process are selected according to the desired results. In particular, the molar ratio of the alternan monomer (anhydroglucose) and functionalizing agents that contain nitrogen groups is coordinated with the desired degree of substitution.

For instance, the following molar ratios can be used:

Ratio for alternan monomer (anhydroglucose): functionalizing agent containing nitrogen groups from 1:0.01 to 1:5, preferably 1:0.1 to 1:2.

The ratio for the alternan monomer (anhydroglucose): hydroxide ions from the alkaline component can be selected as already seen from the production of carboxy methyl cellulose. An exemplary range is 1:0.1 to 1:2.

The liquid reaction medium can be a aqueous reaction medium.

In another special process variant, the liquid reaction medium exclusively or primarily comprises an alcohol. This variant achieves the following benefits in particular:

Higher degrees of substitution and reagent yields are achieved in comparison to a system in which a purely aqueous alkaline reaction medium is used. So, a DS of >0.1, preferably >0.15 is obtained. The amount of the required functionalizing agent can be limited. In other words, relatively little functionalizing agent is needed in order to achieve relatively high DS values.

The ratio of alternan monomer (anhydroglucose):the functionalizing agent in this process variant is preferably 1:0.01 to 1:4, preferably 1:0.1 to 1:1.

A high DS is advantageous if the functionalized alternan is used for metal complexing. For instance, DS values of >0.1, preferably 0.2 or more, can be achieved.

If the liquid reaction medium primarily comprises an alcohol, this means a volume percentage of >50 vol. %, more preferably >60 vol. %, or >70 vol. %, or >80 vol. %, most preferably >90 vol. %. As an additional liquid component a fraction of water can be present, for instance, particularly if aqueous alkali is added as an alkaline component as described below. In particular, the reaction medium is an alcohol-water mixture with the abovementioned vol. % of alcohol.

The alcohol in an embodiment is selected from methanol, ethanol, propanol, isopropanol, butanol, or isobutanol, or any combination thereof.

In this process, the functionalized alternan can be crosslinked, or alternan can first be crosslinked and then functionalized, though the first is preferable. Thus the process in one embodiment comprises a crosslinking step.

The crosslinking can be a chemical crosslinking, for instance using the following crosslinking agents:

Low-molecular aldehydes, ketones and oxidants, such as formaldehyde, glyoxal, pyruvic acid or glutaraldehyde.

Organic, polybasic acid chlorides and their derivatives, for instance succinic acid, glutaric acid, citric acid, adipic acid, malic acid, malonic acid or tartaric acid.

Inorganic crosslinking agents such as inorganic polybasic acids, alkali hypochlorite (includes $Cl_2$ in an alkaline environment), carbonyl chloride, phosphorus oxychloride, polyphosphate, akali-trimetaphosphate or polyfunctional silane.

Epoxy compounds, their derivatives and reactive oligomers and polymers such as epichlorhydrin, epichlorhydrin derivatives, e.g. monofunctional and multifunctional glycidyl ethers, epoxihalides, substituted epoxides, polyepoxides, aliphatic dihalides, substituted polyethylene glycols such as diglycol dichloride.

Grafting agents that can be further reacted to form crosslinking sites, for instance through radical linkings or the polymerization of double bonds. Some examples are acrylic acid compounds, substituted acrylates, compounds containing vinyl groups, aldehyde amide condensates.

In another variant, crosslinks are created physically, for instance through:

Thermal processes (waterless), including melting
Hydrothermic processes (heat/moisture treatment)
Compounding
Freezing/thawing processes In a further process step, anionic groups can be inserted as functional groups into a crosslinked or non-crosslinked alternan that is functionalized with nitrogen groups, thereby producing an amphoteric functionalized alternan. Preferred anionic groups are phosphate, phosphonate, sulfate, sulfonate or carboxyl groups. The molar ratio of anionic groups and nitrogen groups can be 1:1 or about 1:1, or it may differ therefrom. Reagents for introducing such groups are known, for instance from modifying starches with anionic groups. One example is chloracetic acid for introducing carboxyl groups.

In another aspect, the present invention relates to a composition, particularly a cosmetic composition, pharmaceutical composition, wound protectant, ultrasound gel, coating agent, cleaning or laundry additive, sizing agent for textile fibers, simplex creator, binding agent, paper treatment or manufacturing agent, water treatment agent, drilling fluid, foodstuff, food additive, adsorbent, biocide, encapsulants, agrarian composition, complexing agent, emulsifier, surfactant, viscosity regulator, binding agent, adhesive, protective colloid, dispersion agent, ion exchanger, water softener, coagulant, drying additive, anti-condensation additive or drilling additive comprising a functionalized alternan polysaccharide as described above. In addition, the invention relates to the use of the functionalized alternan polysaccharide in such a composition or for manufacturing such a composition. This also includes the use of the functionalized alternan polysaccharide as the main component or sole substance in the abovementioned applications.

The terms drying additive and anti-condensation additive mean that the functionalized alternan polysaccharide is added to a drying agent or anti-condensation agent as an additional component. In this mixture, the functionalized alternan polysaccharide may inter alia act as a viscosity regulator, for instance for thickening a drying agent that has absorbed water.

Preferably, the foodstuffs of the invention, also described herein as "foods," are compositions that contain a functionalized alternan polysaccharide of the invention and (at least) one substance that is ingested by people for nourishment. Substances that people ingest for nourishment include fiber, minerals, water, carbohydrates, proteins, fats, vitamins, secondary plant materials, trace elements, aromas, flavorings and/or food additives.

The cosmetic compositions of the invention should preferably be compositions that contain a functionalized alternan polysaccharide of the invention and one or more of the ingredients listed in the INCI nomenclature (INCI: International Nomenclature of Cosmetic Ingredients). Ingredients in the INCI nomenclature are published in the "International Cosmetic Ingredient Dictionary and Handbook," 11th edition, January 2006, publisher: CTFA, ISBN: 1882621360, among other places. The cosmetic compositions particularly relate to thickening agents for products like creams, gels, soaps and pastes, liquid cleaning agents and care products, stabilizers for foams, and absorbents in hygiene products.

The pharmaceutical compositions of the invention are preferably compositions that contain a functionalized alternan of the invention and (at least) one pharmacologically effective substance in liquids, gels, pastes, films, tablets or delayed-release systems.

One special application for the functionalized alternan in a pharmaceutical composition is its use as an encapsulant for one or more therapeutic active ingredients.

In a pharmaceutical composition, the functionalized alternan can also be present as a therapeutic active ingredient.

As an encapsulant, the functionalized alternan can generally be used for the encapsulation of other substances or living materials, particularly living cells.

In particular, the functionalized alternans of the invention can be suitable for use in food/food compositions that require a certain thickening performance, by providing viscosity and forming gels at relatively low concentrations. Thus they can be used as a viscosity regulator or gelling agent in the manufacturing and preparation process (e.g. in dairy products, baked goods, beverages, desserts, jams, sauces, puddings, sausage products, candy, partially and fully prepared foods, etc.). Since the functionalized alternans of the invention demonstrate little or no cloudiness, they are particularly suitable for use in foods that should or must appear clear. The stabilizing effect and/or emulsifying activity of the functionalized alternans of the invention makes them especially suitable for use in foods that feature lipophilic (e.g. fats) as well as hydrophilic components.

For cosmetic and pharmaceutical compositions, the viscosity imparting properties of functionalized alternans of the invention, as well as their emulsion-stabilizing and/or emulsifying properties, are particularly important. Therefore they can be used in tinctures, creams, lotions, salves, sunscreens, cosmetics, toothpastes, body and hair care products, etc. Since the functionalized alternans of the invention can form various gels, they are also particularly well suited to manufacturing hydrogels. For pharmaceutical compositions, the functionalized alternan polysaccharides of the invention can be used as disintegrants, for instance in tablets.

In yet another aspect, the invention also relates to the use of a functionalized alternan as described above, in a cosmetic composition, a pharmaceutical composition, a wound protectant, an ultrasound gel, a coating agent, a cleaning agent or washing agent additive, a paper manufacturing or paper treatment agent, a water treatment agent, a drilling fluid, a foodstuff, a food additive, a biocide, an encapsulant, an agrarian composition, a complexing agent, an emulsifier, surfactant, viscosity regulator, binding agent, adhesive, protective colloid, dispersion agent, ion exchanger, water softener, coagulant, drying additive, anti-condensation additive, a sizing agent for textile fibers, a simplex creator or a drilling additive.

In these applications, the functionalized alternan can be used alone or in combination with other components. For instance, the functionalized alternan can itself be used as a wound protectant, food additive, coating agent, paper manufacturing or paper treatment agent, water treatment agent, biocide, encapsulant, complexing agent, emulsifier, surfactant, viscosity regulator, binding agent, adhesive, protective colloid, dispersion agent, ion exchanger, water softener, coagulant, drying additive, anti-condensation additive, sizing agent for textile fibers, simplex creator or drilling additive.

The invention is described using examples below.

A) DESCRIPTION OF FIGURES

FIG. 1 shows the molar mass distribution for an alternan polysaccharide that is functionalized with quaternary ammonium groups and features various DS values, compared to the corresponding non-functionalized alternan precursor.

Figure 2:
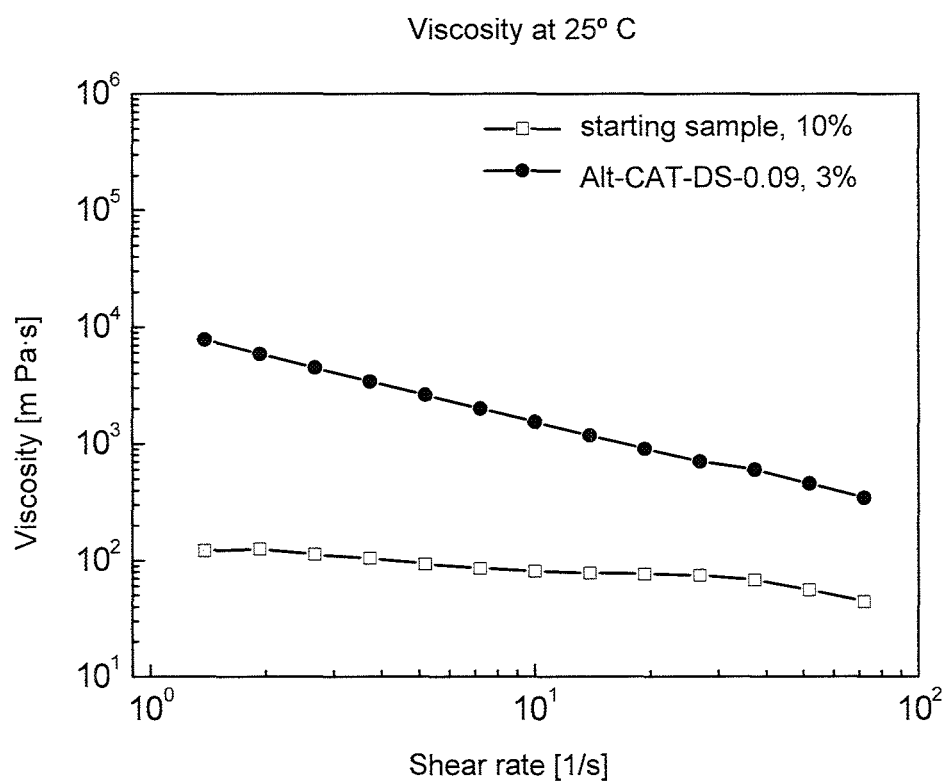
FIG. 2 shows the flow behavior of an alternan polysaccharide that is functionalized with quaternary ammonium groups, compared to the corresponding non-functionalized alternan precursor in a aqueous solution.

FIG. 2 shows the flow behavior of an alternan polysaccharide that is functionalized with quaternary ammonium groups, compared to the corresponding non-functionalized alternan precursor in a aqueous solution.

Figure 3:
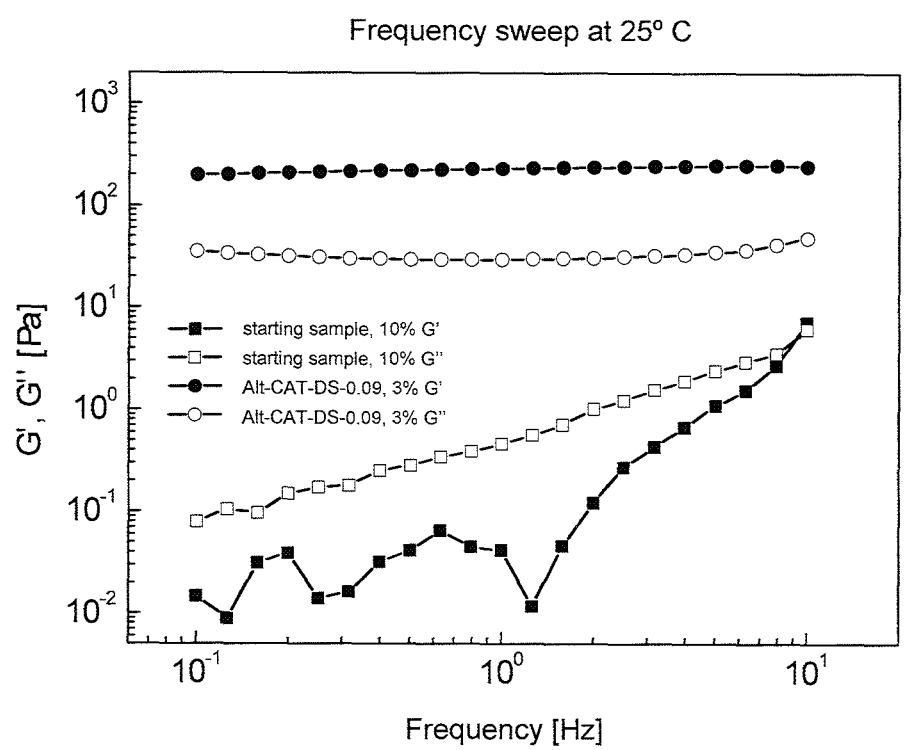
FIG. 3 shows a frequency sweep with dynamic rheology for an alternan polysaccharide that is functionalized with quaternary ammonium groups in a aqueous solution, compared to non-functionalized alternan, in order to determine the solution state.

FIG. 3 shows a frequency sweep with dynamic rheology for an alternan polysaccharide that is functionalized with quaternary ammonium groups in a aqueous solution, compared to non-functionalized alternan, in order to determine the solution state.

Figure 4:
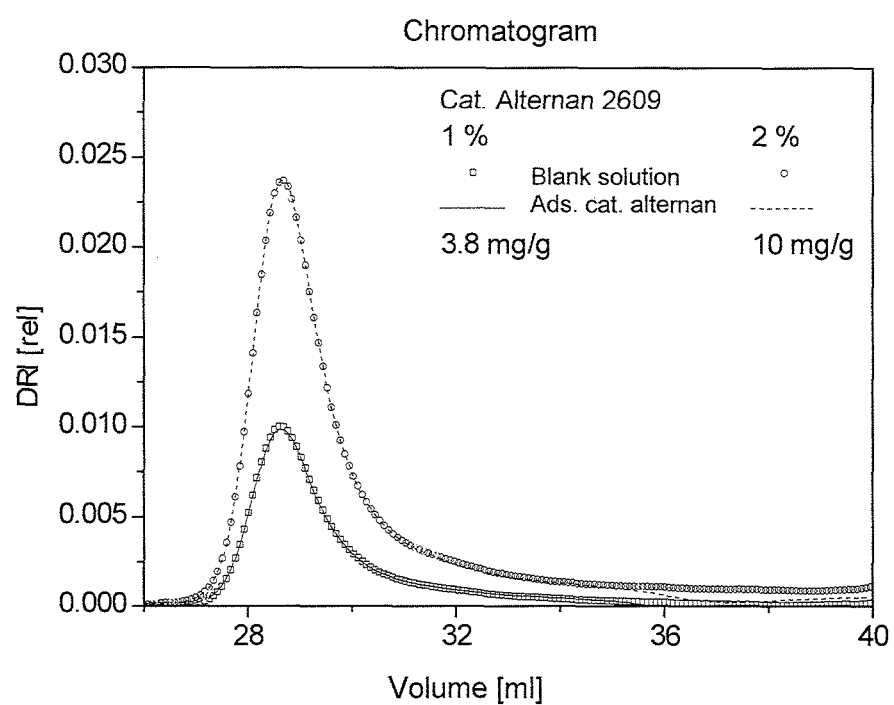
FIG. 4 shows chromatograms before adsorption and after calculating the adsorbed amount of cationic alternan with a paper pulp.

FIG. 4 shows chromatograms before adsorption and after calculating the adsorbed amount of cationic alternan with a paper pulp.

B) GENERAL METHODS

1. Producing Alternan

Alternan can be produced using the enzyme alternan sucrase. The enzyme alternan sucrase can be produced in various ways using procedures known to persons skilled in the art. The production of alternan sucrase and alternan using bacterial strains from the *Leuconostoc mesenteroides* species is described in Raemaekers et al (1997, J. Chem. Tech. Biotechnol. 69, 470-478) and in WO 2006 088884 (see particularly Example 1), among others. However, processes that use *Leuconostoc mesenteroides* to produce the bacterial strains for producing the enzyme alternan sucrase have the disadvantage that these strains also produce other sucrases, particularly dextransucrases. To date, it has not been possible to separate these other sucrases from alternan sucrases. Thus they are a mixture of various enzymes. The alternan produced using this type of enzyme mixture thus also contains a small amount of dextran in addition to alternan. To produce pure alternan, methods for producing alternan sucrase using recombinant organisms are thus preferred.

Processes for producing alternan sucrase using recombinant organisms, and for producing alternan using the enzyme produced in this way, are described in WO 2000

47727, US 2003 229923 (see particularly Examples 2, 5 and 8) and Joucla et al (2006, FEBS Letters 580, 763-768), among others.

2. Functionalization with Quaternary Ammonium Groups 2.1 Specification 1

Chemicals:

4M NaOH 2,3-epoxypropyl-trimethyl ammoniumchloride (Quab® 151) as a aqueous solution with a Quab® 151 content of 90%

1 M HCl

Ethanol

Procedure

Place 300 g aqueous alternan solution (10%) in the Parr reactor

Add 4.62 ml 4M NaOH and mixing with a turbine mixer

Close the reactor and heat to 40° C. while stirring (150 U/min)

Reaction time of 24 h at 40° C.

Cool to room temperature while stirring

Neutralize with 1 M HCl

Dialysis with cellulose acetate membrane, 1 KD

Wash with ethanol

Vacuum-dry

Result: DS 0.05

2.2 Specification 2

Chemicals:

4M NaOH 2,3-epoxypropyl-trimethyl ammonium chloride (Quab® 151) as a aqueous solution with a Quab® 151 content of 90%

1 M HCl

Ethanol

Procedure:

Place 268.5 g $H_2O$ in the Parr reactor

Stir in 30.0 g of alternan (atro) using Ultraturrax (blade rotor)

Add 4.62 ml 4M NaOH and mix with the Ultraturrax

Add 13.79 ml Quab 151 and mix with the Ultraturrax

Close the reactor and heat to 70° C. while stirring

Stirring time 4 h at 70° C.

Cool to room temperature while stirring

Neutralize with 1 M HCl

Dialysis with cellulose acetate membrane, 1 KD

Wash with ethanol

Vacuum-dry

Result: DS 0.09

3. Determining the Degree of Substitution (DS)

The degree of functionalization with quaternary ammonium groups was determined by means of an elementary analysis, CHNS(N) for short. The nitrogen content was determined using an automatic elementary analysis with a FlashEA 1112 Elementary Analyzer Series CHNS/O with a MAS200R autosampler from Thermo Finnigan. The detection limit for the method is 0.01% nitrogen. The DS value was calculated using the following formula:

$$DS = 162 \times \% \ N / (100 \times M_N - \Delta M \times \% \ N)$$

% N—nitrogen content $M_N$—molar mass of the nitrogen $\Delta M$—molar mass of the substituent—molar mass of the proton from the substituted hydroxide group 4. Determining the Molar Mass Distribution Using GPC-MALLS Devices: Alliance 2695 separation module from Waters, DRI detector 2414 from Waters, MALLS Dawn-HE-LEOS detector from Wyatt Technology Inc., Santa Barbara, USA, wavelength λ=658 nm and a K5 flow-through cell Columns: SUPREMA gel column set (PSS Mainz)

Pre Column

Column S30000 with $10^8$-$10^6$,

Column S1000 with $2 \cdot 10^6$-$5 \cdot 10^4$,

Column S100 with $10^5$-$10^3$

Elution: 0.5 m $NaNO_3$

Temperature: 30° C.

Solution: The samples were dissolved in a 0.2% water solution for 24 h at room temperature and 1 h at 95° C., and filtered using a 5 μm membrane filter Analysis: Astra Software 5.3.4.14

5. Rheological Characterization

Rheometer:

The rheometer used was the Kinexus from Malvern. The device has the following specifications:

Measurement systems. Plate-plate, cone-plate, coaxial cylinder, double gap

Torque range from 0.05 μNm to 200 mNm; torque resolution 0.1 nNm

Frequency range: 1 μHz-150 Hz

Temperature range: −40-200° C.; resolution 0.01° C.

Producing the Solutions

The aqueous solution for the carboxy methyl alternan was stirred in deionized water for 60 minutes at room temperature, at the respective quantity ratios for the concentration.

Measuring the Flow Behavior

Viscosity was measured in the cone-plate measurement system directly after the solution was produced, in dependency of the shear rate.

Dynamic Rheology

Dynamic rheology is used to measure the structure of a solution or dispersion, a gel or a solid body by measuring the storage (G') and loss modulus (G") and/or the elastic and viscose proportion dependent on frequency or deformation. This method was used to measure G' and G" depending on the frequency, and to evaluate the structure of the functionalized alternan in water at the respective concentration, compared to the unsubstituted alternan, based on the results of the measurement data. The selected frequency range was between 0.1-10 Hz.

Performance of Rheological Measurements.

Measurement system: Cone-plate measurement system

Concentration of the aqueous solutions: 3-10%

Temperature: 25° C.

The methodology for rheological characterization was as follows:

Flow behavior in the range of the shear rate between 1 and 100 $s^{-1}$

Frequency sweep from 1-10 Hz

6. Determining the Adsorption Behavior of Cationic Alternan with a Paper Pulp

A paper pulp was treated as follows in a aqueous solution of the alternan polysaccharide functionalized with quaternary ammonium groups (cationic alternan) with a DS value of 0.09:

A 0.5% stock solution with the cationic alternan was placed in 0.01M of NaCl.

The pulp was torn into small pieces by hand, and presoaked as a 1% concentration in 0.01 of NaCl for one hour (+0.02% $NaN_3$)

Next, the respective amount of the cationic alternan was added by dosing the corresponding volume of the alternan stock solution (1% or 2% cationic alternan in relation to the pulp content of the suspension)

The adsorption time was one hour. During this time, the suspension was moved at 300 rpm in a shaking device After adsorption, the pulp was separated out with a sieve and the filtrate was analyzed using gel permeation chromatography (GPC)

Another blank solution was prepared in the same manner and analyzed using GPC without adding pulp in order to determine the initial concentration ($c_0$)

The adsorbed alternan volume was determined according to the following equation:

$$\Gamma = \frac{[c_0 - (c_E * F)] * V}{m}$$

$\Gamma$ [mg/g] adsorbed alternan amount per gram of pulp $C_0$ [μg/ml] initial alternan concentration $C_E$ [μg/ml] equilibrium concentration m [g] mass of the pulp V [l] volume of the adsorption solution

C) EXAMPLES

1. Functionalization with Quaternary Ammonium Groups

The following Table 1 shows the results of the functionalization. The products of the synthesis are shown together with the most important information about their production.

The molar ratios for alternan monomer (anhydroglucose unit, AGE):reagent (R=functionalizing agent):alkalizing agent NaOH were varied, along with the reaction conditions, namely temperature and reaction time. The description of the alternan derivative included the resulting DS value. Thus the description "Alt-cat-DS-0.02" refers to an alternan polysaccharide cationically modified with quaternary ammonium groups, with DS=0.02. The reagent was Quab 151, a glycidyl-trimethyl ammonium chloride from Quab Chemicals (www.quab.com).

TABLE 1

| Derivative description | Reagent | Molar ratio AGE:R:NaOH | Conditions | Reaction medium |
|---|---|---|---|---|
| Alt-cat-DS-0.02 | Quab 151 | 1:0.1:0.5 | 24 h 80° C. Parr reactor | $H_2O$ |
| Alt-cat-DS-0.04 | Quab 151 | 1:0.2:0.5 | 24 h 80° C. Parr reactor | $H_2O$ |
| Alt-cat-DS-0.05 | Quab 151 | 1:0.2:0.1 | 24 h 40° C. Parr reactor | $H_2O$ |
| Alt-cat-DS-0.09 | Quab 151 | 1:0.5:0.1 | 4 h 70° C. Parr reactor | $H_2O$ |

2. Producing Aqueous Solutions

The cationically modified alternan was used to produce aqueous 1% solutions at room temperature and at 95°. The solutions were homogenous and showed hardly any sedimentation, and they differed in terms of their transparency. The differences in transparency were measured spectrophotometrically compared to the initial sample, at a wavelength of 650 nm. The following table provides an overview of the measurement data. With the exception of the sample Alt-CM-DS-0.06, which can be considered an outlier, the transparency was significantly increased by the substitution.

TABLE 2

Transparency of a cationic alternan polysaccharide in solution

| | Transparency at 650 nm, c = 1% | |
|---|---|---|
| Sample | After producing the solution at 25° C. | After producing the solution at 95° C. |
| Alternan | 70.8 | 75.0 |
| Alt-cat-DS-0.02 | 86.1 | 86.6 |
| Alt-cat-DS-0.04 | 84.5 | 86.9 |
| Alt-cat-DS-0.05 | 90.9 | 93.4 |

3. Molecular Characterization

FIG. 1 shows the molar mass distribution for various cationic alternans.

4. Rheological Characteristics

The cationic alternan functionalized with quaternary ammonium groups was characterized in terms of the flow behavior, in dependency of on the shear rate and using dynamic rheology, with respect to the solution structure.

Introducing quaternary ammonium groups resulted in alternan derivatives that formed such strong viscosity that it was no longer possible to measure 10% aqueous solutions, and the concentration had to be lowered to 3%. The viscosities were several times higher than for the 10% alternan solution (FIG. 2). The values for G' (storage modulus) and G" (loss modulus) were also increased. G' (storage modulus) and G" (loss modulus) showed hardly any dependency on the frequency. The storage modulus showed much higher values than the loss modulus (FIG. 3), which is evidence of a gel state. The cationic alternan ethers with a high molar mass demonstrated the characteristic of hydrogel formation, which was surprising at relatively low degrees of substitution. The gel is not a particle gel, but is formed from overlapping macromolecules.

5. Adsorption Behavior of Cationic Alternan with a Paper Pulp

FIG. 4 shows chromatograms before adsorption and after calculating the adsorbed volume of cationic alternan on a paper pulp. The result was that the volume of the cationic alternan used was completely identical with the adsorbed cationic alternan. The cationic alternan was completely integrated by the paper pulp, as shown in FIG. 4.

6. Spinning Experiments

The following are the results of investigating filament formation with 10% and 12.5% aqueous solutions of the alternan.

The solutions were pressed through a nozzle into a coagulation bath containing denatured ethanol. The capacity to coagulate was investigated at 0° C., room temperature and 70° C. When they emerged from the nozzle, the alternan solutions did not form a string, but rather drops, which formed a fine white precipitate in the coagulation bath at every temperature investigated.

In further experiments, the concentrated alternan solution was extruded. In the process, it first formed a colorless string that was aimed directly into the coagulation bath. The string turned white due to the dehydration and disintegrated into small particles. The string did not have any mechanical stability. The temperature of the coagulation medium did not have any significant effects on string stability.

It was not possible to create a fibrillar structure with alternan.

The invention claimed is:

1. Functionalized alternan polysaccharide, comprising nitrogen groups that can be protonated or permanently positively charged nitrogen groups as functional groups, wherein said nitrogen groups are bound to the alternan polysaccharide via an ether bridge, wherein the functionalized alternan polysaccharide comprises structures of Formula (III):

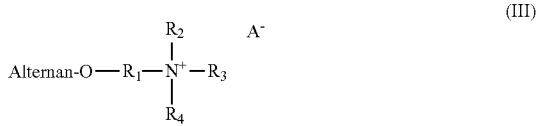

wherein:
$R_1$ is a hydrocarbon group with 1 to about 100 carbon atoms that may comprise one or more heteroatoms,
$R_2$, $R_3$ and $R_4$ are each a hydrocarbon group with 1 to about 20 carbon atoms that can comprise one or more heteroatoms, wherein $R_2$, $R_3$ and $R_4$ can be the same or different, wherein the residues $R_1$, $R_2$, $R_3$ and $R_4$ can be selected independently from each other in multiple —$R_1N^+R_2R_3R_4$ groups,
and $A^-$ is an anion, and
the functionalized alternan polysaccharide further comprises one or more of the groups of Formula (V):

wherein:
the group of Formula (V) is bound to the alternan polysaccharide via an ether bridge,
n is an integer from 1 to about 30,
$R_5$ and $R_6$ are selected from a hydrocarbon group with 1 to about 6 carbon atoms, wherein $R_5$ and $R_6$ can have the same or different meaning in the —(CHR$_5$—CHR$_6$O)— units and each $R_5$ and $R_6$ in a —(CHR$_5$—CHR$_6$O)— unit can be selected independently from each $R_5$ and $R_6$ in another —(CHR$_5$—CHR$_6$—O)— unit.

2. Functionalized alternan polysaccharide according to claim 1, wherein the nitrogen groups are selected from primary amine groups, secondary amine groups, tertiary amine groups, quaternary amine groups or imino carbamate groups.

3. Functionalized alternan polysaccharide according to claim 1, comprising structures of Formula (I):

wherein
$R_1$ is a hydrocarbon group with 1 to about 100 carbon atoms, that may comprise one or more heteroatoms, $R_2$ and $R_3$ are each a hydrogen or hydrocarbon group with 1 to about 20 carbon atoms that can comprise one or more heteroatoms, wherein $R_2$ and $R_3$ can be the same or different,
or $R_2$ and $R_3$ can form a 4-8 membered heterocyclic ring together with the nitrogen to which they are bound, wherein said ring can be condensed with one or more additional isocyclic or heterocyclic rings, wherein the nitrogen can be bound to one of the $R_2$ or $R_3$ groups by way of a double bond and then bears a positive charge,
wherein the nitrogen in Formula (I) is optionally protonated, and
wherein the residues $R_1$, $R_2$ and $R_3$ can be selected independently from each other in multiple —$R_1NR_2R_3$ groups.

4. Functionalized alternan polysaccharide according to claim 1, comprising structures of Formula (II):

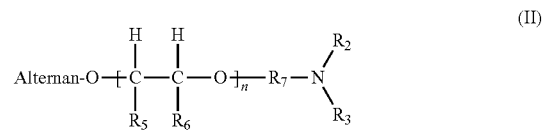

wherein $R_2$ and $R_3$ are each a hydrogen or hydrocarbon group with 1 to about 20 carbon atoms that can comprise one or more heteroatoms, wherein $R_2$ and $R_3$ can be the same or different, or $R_2$ and $R_3$ can form a 4-8 membered heterocyclic ring together with the nitrogen to which they are bound, wherein said ring can be condensed with one or more additional isocyclic or heterocyclic rings, wherein the nitrogen can be bound to one of the $R_2$ or $R_3$ groups by way of a double bond and then bears a positive charge,
n is an integer from 1 to about 30,
$R_5$ and $R_6$ are selected from H or a hydrocarbon group with 1 to about 6 carbon atoms, wherein $R_5$ and $R_6$ can have the same or different meaning in the —(CHR$_5$—CHR$_6$O)— units and each $R_5$ and $R_6$ in a —(CHR$_5$—CHR$_6$O)— unit can be selected independently from each $R_5$ and $R_6$ in another —(CHR$_5$—CHR$_6$—O)— unit,
$R_7$ is a hydrocarbon group with 1 to about 10 carbon atoms that can comprise one or more heteroatoms,
wherein the number n and the residues $R_2$, $R_3$, $R_5$, $R_6$ and $R_7$ can be selected independently from each other in multiple
—[CHR$_5$—CHR$_6$—O]$_n$R$_7$NR$_2$R$_3$ groups,
and wherein the nitrogen in Formula (II) is optionally protonated.

5. Functionalized alternan polysaccharide according to claim 1, comprising structures of Formula (IV):

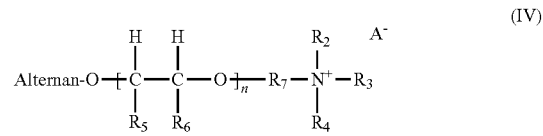

wherein
n is an integer from 1 to about 30,
$R_2$, $R_3$ and $R_4$ are each a hydrogen or hydrocarbon group with 1 to about 20 carbon atoms that can comprise one or more heteroatoms, wherein $R_2$ and $R_3$ can be the same or different, or $R_2$ and $R_3$ can form a 4-8 membered heterocyclic ring together with the nitrogen to which they are bound, wherein said ring can be condensed with one or more additional isocyclic or heterocyclic rings, wherein the nitrogen can be bound to one of the $R_2$ or $R_3$ groups by way of a double bond and then bears a positive charge, $R_5$ and $R_6$ are selected from H or a hydrocarbon group with 1 to about 6 carbon atoms, wherein $R_5$ and $R_6$ can have the same or different meaning in the —($CHR_5$—$CHR_6O$)— units and each $R_5$ and $R_6$ in a —($CHR_5$—$CHR_6O$)— unit can be selected independently from each $R_5$ and $R_6$ in another —($CHR_5$—$CHR_6$—O)— unit, $R_7$ is a hydrocarbon group with 1 to about 10 carbon atoms that can comprise one or more heteroatoms, and wherein the number n and the residues $R_2$, $R_3$, $R_4$, $R_5$, $R_6$ and $R_7$ can be selected independently from each other in multiple —[$CHR_5$—$CHR_6$—O]$_n R_7 N^+ R_2 R_3 R_4$ groups, and $A^-$ is an anion.

6. Functionalized alternan polysaccharide according to claim 1, wherein the functionalized alternan polysaccharide has an average molar weight Mw in the range from more than 3,000 g/mol to 60,000,000 g/mol.

7. Functionalized alternan polysaccharide according to claim 1, wherein the functionalized alternan polysaccharide has an average number of functionalized hydroxyl groups of 0.02 to 3 per anhydroglucose unit.

8. Functionalized alternan polysaccharide according to claim 1, wherein the functionalized alternan polysaccharide is crosslinked.

9. Functionalized alternan polysaccharide according to claim 1, wherein the functionalized alternan polysaccharide further comprises anionic groups.

10. Functionalized alternan polysaccharide according to claim 1, wherein the functionalized alternan polysaccharide is water-soluble.

11. Functionalized alternan polysaccharide according to claim 1, wherein the functionalized alternan polysaccharide is not micro-structured.

12. A cosmetic composition, pharmaceutical composition, wound protectant, ultrasound gel, coating agent, cleaning or laundry additive, sizing agent for textile fibers, simplex creator, paper treatment or manufacturing agent, water treatment agent, drilling fluid, foodstuff, food additive, adsorbent, biocide, encapsulant, agrarian composition, complexing agent, emulsifier, surfactant, viscosity regulator, binding agent, adhesive, protective colloid, dispersion agent, ion exchanger, water softener, coagulant, drying additive, anti-condensation additive or drilling additive, comprising or consisting of a functionalized alternan polysaccharide according to claim 1.

13. Method for functionalizing alternan polysaccharide with nitrogen groups that can be protonated or permanently positively charged nitrogen groups, wherein the alternan is reacted in a liquid reaction medium with a functionalizing agent that comprises such a nitrogen group with the addition of an alkaline component to produce a functionalized alternan polysaccharide according to claim 1.

14. Method according to claim 13, wherein the liquid reaction medium exclusively or primarily comprises an alcohol.

\* \* \* \* \*